(12) United States Patent
Montpetit

(10) Patent No.: US 6,366,761 B1
(45) Date of Patent: Apr. 2, 2002

(54) PRIORITY-BASED BANDWIDTH ALLOCATION AND BANDWIDTH-ON-DEMAND IN A LOW-EARTH-ORBIT SATELLITE DATA COMMUNICATION NETWORK

(75) Inventor: Marie-José Montpetit, Bellevue, WA (US)

(73) Assignee: Teledesic LLC, Kirland, WA (US)

(*) Notice: Subject to any disclaimer, the term of this patent is extended or adjusted under 35 U.S.C. 154(b) by 0 days.

(21) Appl. No.: 09/167,410

(22) Filed: Oct. 6, 1998

(51) Int. Cl.$^7$ .............................................. H04B 7/185
(52) U.S. Cl. ...................... 455/12.1; 455/428; 455/430; 455/453; 455/455; 370/230; 370/316; 370/341; 370/412
(58) Field of Search ................................. 455/427, 428, 455/429, 430, 12.1, 13.1, 13.2, 434, 445, 446, 447, 450, 453, 455; 370/230, 232, 236, 316, 321, 322, 347, 348, 412–418, 436, 442–444, 437, 458–461

(56) References Cited

U.S. PATENT DOCUMENTS

| 5,132,964 A | * | 7/1992 | Esaki ......................... 370/418 |
| 5,251,209 A | * | 10/1993 | Jurkevitch et al. .......... 370/468 |
| 5,363,374 A | | 11/1994 | Zein Al Abedeen et al. |
| 5,592,470 A | | 1/1997 | Rudrapatna et al. |
| 5,699,355 A | * | 12/1997 | Natarajan .................... 370/322 |
| 5,774,668 A | * | 6/1998 | Choquier et al. ........... 709/223 |
| 5,826,169 A | * | 10/1998 | Natarajan ................... 455/13.1 |

(List continued on next page.)

FOREIGN PATENT DOCUMENTS

| EP | 0 662 775 A1 | 7/1995 |
| EP | 0 719 062 A2 | 6/1996 |
| WO | WO 97/35408 | 9/1997 |

OTHER PUBLICATIONS

A. Hung, M.–J. Montpetit, and G. Kesidis, ATM via satellite: A framework and implementation, ACM–Baltzer Wireless, Special Issue on Hybrid and Satellite Communication Networks, vol. 4, 1998, pp. 141–153.

A. Hung, M.–J. Montpetit, G. Kesidis, and P. Takats, A Framework for ATM via Satellite, Proceedings of the IEEE Globecom Conference, London, UK, Nov. 1996.

*Primary Examiner*—Dwayne Bost
*Assistant Examiner*—Charles Craver
(74) *Attorney, Agent, or Firm*—Christensen O'Connor Johnson & Kindness PLLC

(57) ABSTRACT

A data communication system and method that allocates an amount of bandwidth to a ground terminal for uplink transmission of one or more data packets in a low-Earth-orbit (LEO) satellite data communication network. A bandwidth request message is generated and transmitted to a bandwidth allocation processing unit in the LEO satellite data communication network. The bandwidth request message requests allocation of an amount of bandwidth to a ground terminal for uplink transmission of one or more data packets and identifies a priority status of the data packets for which bandwidth is sought. The bandwidth allocation processing unit allocates bandwidth to the ground terminal in accordance with the priority status identified in the bandwidth request message. Allocated bandwidth is reported to the ground terminal in a bandwidth allocation response. If sufficient bandwidth is not available to satisfy a bandwidth request message, the bandwidth request may be denied or a partial allocation of bandwidth may be permitted. Furthermore, bandwidth allocated for transmission of data packets having a lower priority status may be preempted in favor of bandwidth for transmitting data packets having a higher priority status. Bandwidth allocation is managed using a data structure having a number of slots that represent portions of the bandwidth which are selectively allocated to ground terminals for uplink transmission of data packets.

27 Claims, 10 Drawing Sheets

U.S. PATENT DOCUMENTS 5,920,701 A * 7/1999 Miller et al. ................. 709/228
5,995,805 A * 11/1999 Ogasawara et al. ......... 455/13.1
6,058,307 A * 5/2000 Garner ....................... 455/428
6,094,575 A * 7/2000 Anderson et al. ............ 455/422
6,111,863 A * 9/2000 Rostoker et al. ............. 370/329
6,141,534 A * 10/2000 Snell et al. ................. 455/12.1

* cited by examiner

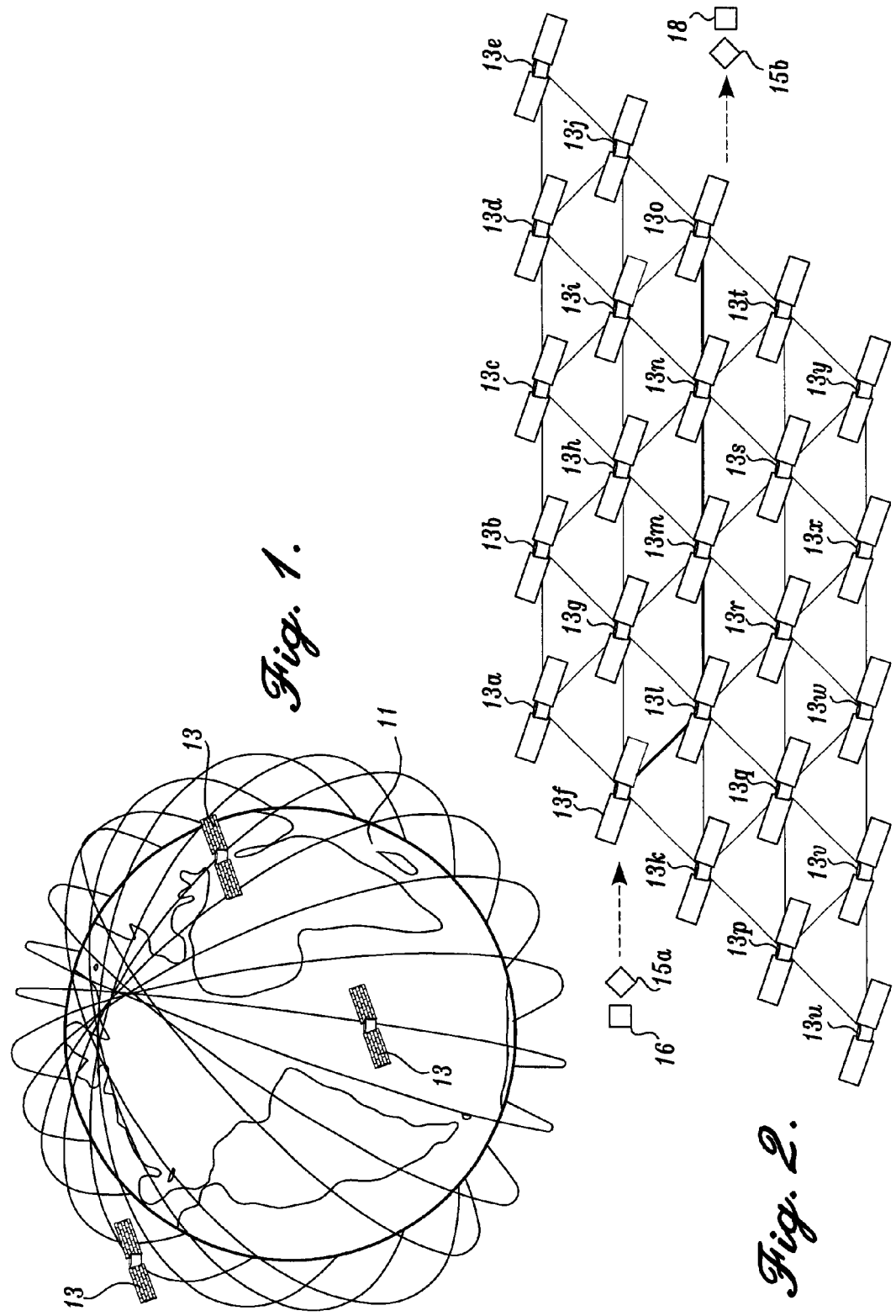

*Fig. 7.*

| | $t_1$ | $t_2$ | $t_3$ | $t_4$ | ... | | | $t_p$ |
|---|---|---|---|---|---|---|---|---|
| $f_1$ | $GT_1P1$ | $GT_1P1$ | $GT_1P1$ | 0 | | | | |
| $f_2$ | $GT_2P2$ | $GT_2P2$ | 0 | $GT_3P2$ | | | | |
| $f_3$ | $GT_4P1$ | $GT_4P1$ | $GT_4P2$ | $GT_2P3$ | | | | |
| $f_4$ | $GT_3P4$ | $GT_3P4$ | 0 | 0 | | | | |
| ... | | | | | | | | |
| $f_n$ | | | | | | | | |

| $GT_1$ | $GT_2$ | $GT_3$ | $GT_4$ | $GT_5$ | |
|---|---|---|---|---|---|

*Fig. 13.*

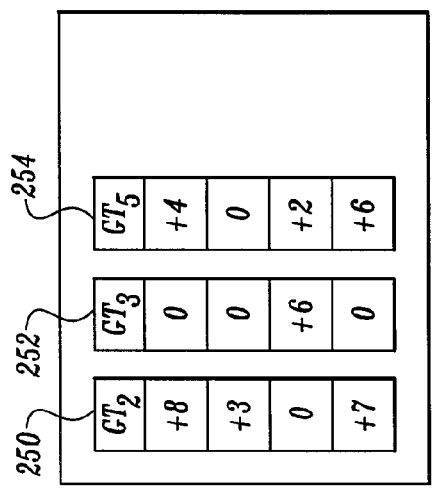
Fig. 12.
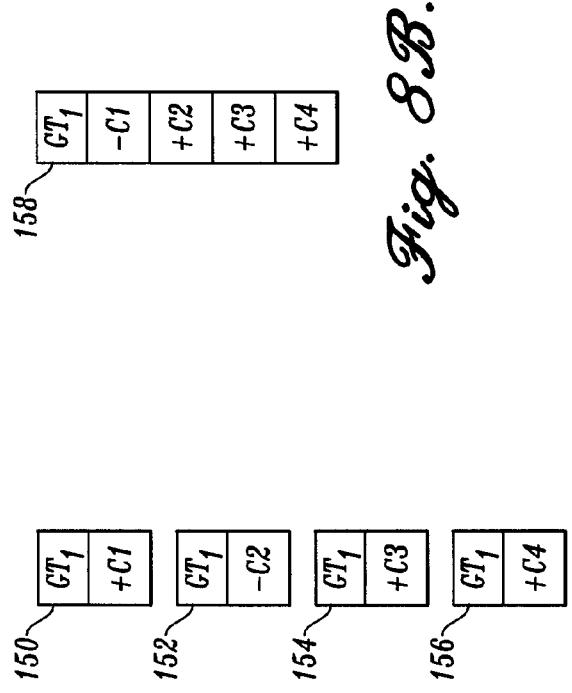
Fig. 8B.
Fig. 8A.
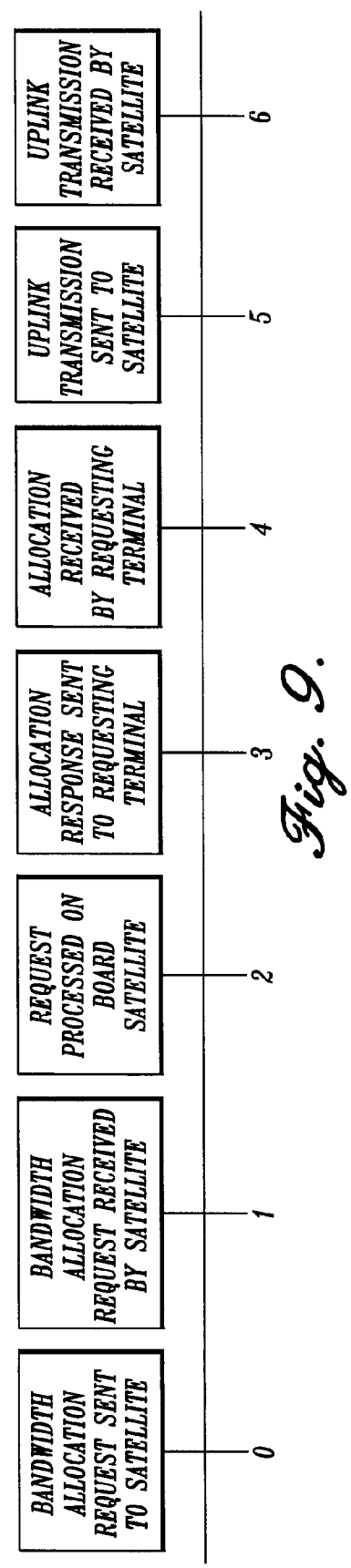
Fig. 9.

PRIORITY-BASED BANDWIDTH ALLOCATION AND BANDWIDTH-ON-DEMAND IN A LOW-EARTH-ORBIT SATELLITE DATA COMMUNICATION NETWORK

FIELD OF THE INVENTION

The invention relates to data communication networks and, more particularly, to bandwidth allocation in digital satellite data communication networks.

BACKGROUND OF THE INVENTION

In recent years the need for global data networking capability has rapidly expanded. Broadband satellite data communication networks have been proposed as an alternative to existing land-based data communication networks. One type of satellite data communication network is described in a variety of U.S. patents assigned to the assignee of the present invention, including U.S. Pat. Nos. 5,386,953; 5,408,237; 5,527,001; 5,548,294; 5,621,415; 5,641,135; 5,642,122; 5,650,788; 5,736,959 and 5,740,164. These patents and other commonly assigned pending patent applications describe a satellite data communication network that includes a constellation of low-Earth-orbit (LEO) satellites capable of transmitting data from one location on the Earth's surface to another location. More specifically, each LEO satellite has a communication footprint that covers a portion of the Earth's surface as a satellite passes over the Earth. The communication footprint defines the area of the Earth within which ground terminals can communicate with the satellite. During the period of time a ground terminal remains within the border of a satellite's footprint, the ground terminal may transmit data to and receive data from the "servicing" satellite. When a satellite reaches the end of its servicing arc and the ground terminal passes outside the satellite's communication footprint, another satellite in orbit is positioned to service the ground terminal previously covered by the satellite reaching the end of its servicing arc.

Data to be sent from one location to another location on the Earth is transmitted from a ground terminal to the LEO satellite servicing the ground terminal via an uplink data channel. The data is routed through the constellation of LEO satellites to the satellite servicing the ground terminal that is to receive the data. The latter satellite transmits the data to the receiving ground terminal via a downlink data channel. Thus, the constellation of LEO satellites and the ground terminals form a satellite data communication network wherein the ground terminals and satellites form nodes of the network.

Existing data communication networks that use geosynchronous satellites for data transmission are subject to numerous disadvantages in comparison to a LEO satellite network. By their nature, geosynchronous satellites are located at a very high altitude (37,000 km) from the Earth. Because of the distance involved, both uplink and the downlink transmission times to the geosynchronous satellite are significant. For many applications requiring timely delivery of data signals, the amount of delay introduced by geosynchronous satellite communication is often dissatisfying or unacceptable. Geosynchronous satellite communication also requires a high power ground terminal to be able to communicate with the geosynchronous satellite.

Since LEO satellites orbit the Earth at a much lower altitude than a geosynchronous satellite, data signals communicated via LEO satellites do not travel the same amount of distance and therefore do not experience as much time in transmission. LEO satellites also cost much less to put into orbit and are able to communicate with lower power ground terminals. Nevertheless, communication via LEO satellites has its own set of challenges to address, primarily due to the fact that the orbit of a LEO satellite does not match the rotation of the Earth. The constant orbital motion of LEO satellites passing in and out of range of a particular ground terminal on the Earth not only affects the allocation of transmission resources and scheduling of data transmissions in the LEO satellite network but also affects the routing of data transmissions between satellites and the receiving ground terminal.

Problems with scheduling and routing of data transmissions, as well as inefficient allocation of transmission capacity, are present in other existing data communication networks. For instance, while the global interconnection of computer networks known as the Internet routes data packets with the anticipation that the packets will eventually be received by the intended receiver, it is not uncommon for packets to be lost or delayed during transmission. There is no guarantee if or when a packet will be actually delivered to an intended receiver. Only a "best effort" is given to the transmission of data, regardless of the relative importance given by the sender to the transmission.

Moreover, the current Internet does not differentiate between different types of data being transmitted. For example, data packets requiring delivery within a certain time frame (e.g., for real-time video or audio communication) receive no preference in transmission over packets that generally do not require a particular time of delivery (e.g., electronic mail). Similarly, data packets carrying important information for which packet loss cannot be tolerated (e.g., medical images) receive no greater priority than other data packets. Because all data packets are viewed as equally important in terms of allocating transmission resources, less critical transmissions, such as e-mail, may serve to delay or displace more important and time-sensitive data.

Furthermore, capacity for data transmission in existing data communication networks is often inefficiently allocated. In some instances, transmission capacity, or bandwidth, is allocated to a particular user according to a fixed schedule or particular network setup, but the bandwidth is not actually used. In other instances, a user is precluded from transmitting a burst of data that, for the moment, exceeds the user's bandwidth allocation. Existing data communication networks have lacked mechanisms whereby bandwidth may be allocated on-demand.

SUMMARY OF THE INVENTION

The present invention is a system and method for allocating transmission capacity, or bandwidth, in a LEO satellite data communication network. More specifically, the present invention provides a priority-based system and method of allocating bandwidth for uplink transmission of one or more data packets from a ground terminal to a servicing satellite in the LEO satellite data communication network. Uplink bandwidth is allocated based on a priority status assigned to the data packets to be transmitted. It is intended that the uplink bandwidth, once allocated for transmission of data packets, will enable the data transmission to meet or exceed a user-selected standard of data transmission service (otherwise referred to as a "quality of service"). Different data packets in a data transmission may be assigned different levels of priority status so that the overall data transmission meets or exceeds the selected quality of service.

Prior to transmitting a data packet via an uplink signal to a servicing satellite overhead, the ground terminal first obtains an allocation of uplink signal bandwidth to transmit the data packet. Uplink bandwidth is preferably divided into slots representing time and signal frequency and is allocated for transmission of data packets in accordance with the assigned priority status of the data packets. Bandwidth for transmitting higher priority data packets is allocated before bandwidth for transmitting data packets with a lower priority status.

The system and method of the present invention provide a bandwidth-on-demand feature. Bandwidth for uplink transmission is allocated on request. Likewise, previously allocated uplink bandwidth may be deallocated on request. In one embodiment of the invention, a bandwidth allocation processor onboard a LEO satellite receives and processes bandwidth allocation requests sent to the satellite. The bandwidth allocation processor reports bandwidth allocations to the requesting ground terminals so that the ground terminals may transmit data packets having a corresponding priority status at the allocated time and frequency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a pictorial diagram showing the orbital paths of a constellation of low-Earth-orbit (LEO) satellites positioned to cover the surface of the Earth;

FIG. 2 is a plan view of a portion of the constellation of LEO satellites depicted in FIG. 1 with interconnecting lines illustrating communication paths between the LEO satellites;

FIG. 7 is a pictorial diagram of a bandwidth allocation table formed according to the present invention, with selected entries shown;

FIG. 8A is a pictorial diagram of separate bandwidth allocation requests prepared by a ground terminal requesting bandwidth for transmission of data packets having different priority status;

FIG. 8B is a pictorial diagram of a combined bandwidth allocation request prepared by a ground terminal requesting bandwidth for transmission of data packets having different priority status;

FIG. 9 is a time line illustrating a timing of events in a bandwidth allocation and uplink transmission performed in accordance with the present invention;

FIG. 12 is a pictorial diagram illustrating an example onboard computer queue with three bandwidth allocation requests configured as shown in FIG. 8B; and FIG. 13 is a pictorial diagram of an example list of active ground terminals in the LEO satellite data communication network.

DETAILED DESCRIPTION OF THE PREFERRED EMBODIMENT

Figure 3:
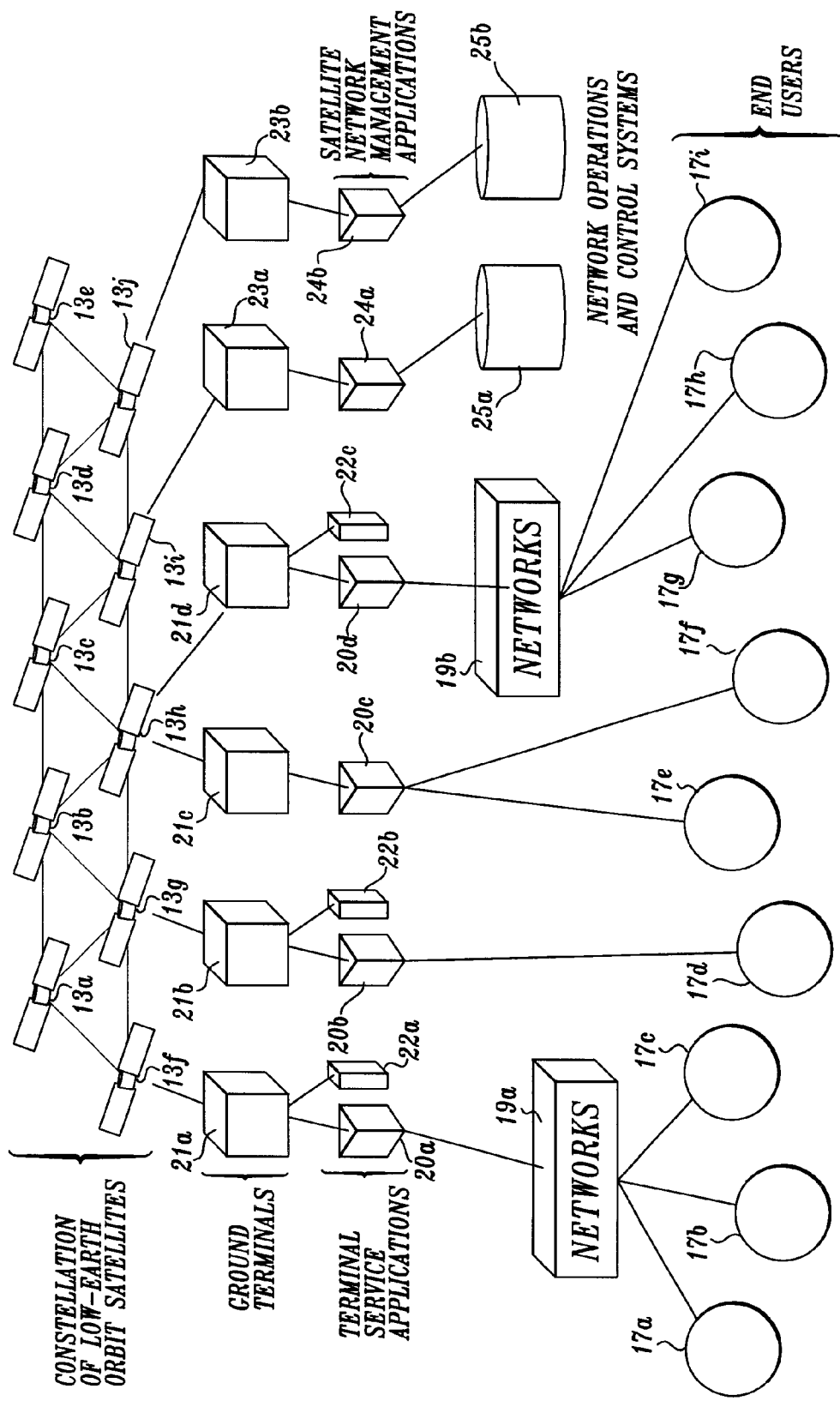
FIG. 3 is a pictorial diagram illustrating the major components of a LEO satellite data communication network with interconnecting lines illustrating various communication paths therebetween.

The present invention is a system and method for priority-based uplink bandwidth allocation in a low-Earth-orbit (LEO) satellite data communication network. Prior to discussing the bandwidth allocation system and method of the present invention, a brief overview of a LEO satellite data communication network is provided.

A LEO satellite data communication network includes a constellation of satellites orbiting the Earth such that a vast majority of the Earth is within the transmission range of at least one satellite at any point in time. One proposed LEO satellite data communication network employs 288 satellites, plus spares, located in 12 polar orbit planes. Each plane includes 24 satellites at an altitude of approximately 1,350 kilometers. The path of travel of the satellites of such a network is generally depicted in FIG. 1. More specifically, FIG. 1 depicts the Earth 11 surrounded by a plurality of rings that depict the orbital planes of a plurality of satellites 13.

FIG. 2 illustrates a number of the satellites 13a, 13b, 13c . . . 13y that make up the constellation of satellites in a LEO satellite data communication network of the type illustrated in FIG. 1. The satellites are shown close to one another for illustrative purposes only. FIG. 2 also illustrates ground terminals 16 and 18 in data communication with satellites 13f and 13o, respectively. The satellites and the satellite terrestrial interface of the ground terminals form the core of the LEO satellite data communication network.

In the data communication shown in FIG. 2, the ground terminal 16 transmits a data signal 15a, consisting of one or more data packets, to a first satellite 13f using an uplink communication frequency. The data packets are then routed independently from satellite 13f through the constellation of satellites. A number of factors may affect the routing path taken, including network traffic patterns and priority status assigned to the data packets. For example, as shown in FIG. 2, the uplink satellite 13f forwards one or more of the data packets to a second satellite 13l, which forwards the data packets to a third satellite 13m, which forwards the data packets to a fourth satellite 13n. The routing continues until the data packets reach the satellite 13o servicing the ground terminal 18 that is to receive the data packets. The satellite 13o transmits the data packets via a downlink signal 15b to the ground terminal 18. The ground terminal 18 may then route the data to an end user (not shown).

FIG. 3 illustrates the major components of a LEO satellite data communication network of the type depicted in FIGS. 1 and 2. The satellites 13a, 13b, 13c . . . 13j are shown with interconnecting lines depicting intersatellite communication paths. Interconnecting lines also show communication paths between the satellites 13a, 13b, 13c . . . 13j and a plurality of ground terminals 21a, 21b, 21c, and 21d located on the Earth. Each of the ground terminals 21a, 21b, 21c, and 21d uses a satellite terrestrial interface to send data packets to and receive data packets from the constellation of satellites via uplink and downlink transmission.

A number of end users 17a, 17b, 17c . . . 17i interface with the LEO satellite network by way of a plurality of terminal service applications (TSAs) 20a, 20b, 20c, and 20d. The end users communicate with the TSAs 20a, 20b, 20c and 20d, either directly, or indirectly through networks 19a and 19b. Data received by the TSAs 20a, 20b, 20c, and 20d for transmission through the LEO satellite network is formatted into one or more data packets for transmission by the ground terminals 21a, 21b, 21c, and 21d. In terms of a physical arrangement, a TSA may be implemented directly within a ground terminal, thereby providing the ground terminal with a user service interface in addition to the ground terminal's satellite terrestrial interface.

A number of reservation servers 22a, 22b and 22c may also be included in the satellite data communication network to coordinate reservation of network communication capacity. Furthermore, network operations and control systems 25a and 25b are shown in communication with the satellites via separate satellite network management applications 24a and 24b, and ground terminals 23a and 23b.

In accordance with the present invention, each data packet to be transmitted through the LEO satellite data communication network is assigned a priority status. The manner in which the data packet is communicated through the LEO satellite network is based, in part, on the data packet's assigned priority status. One data packet configuration suitable for use in a data communication network formed according to the present invention is illustrated in FIG. 4.

Figure 4:
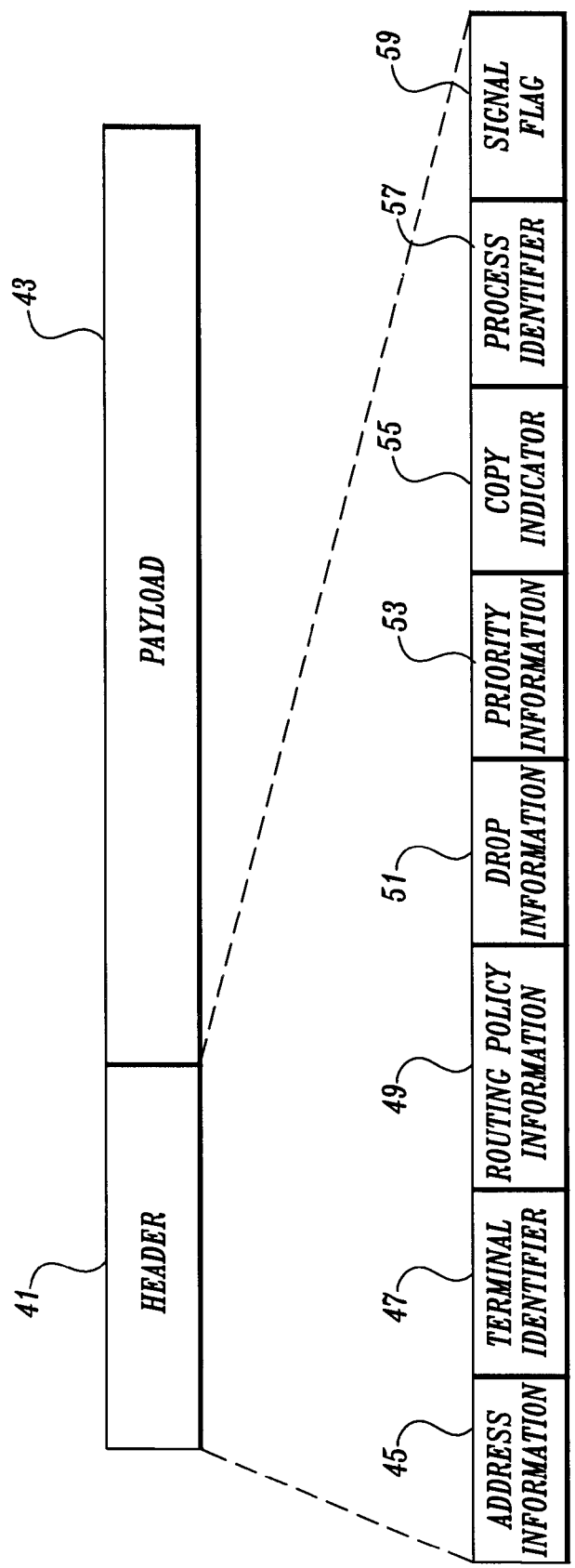
FIG. 4 is a pictorial diagram of a data packet formed in accordance with the present invention.

The data packet illustrated in FIG. 4 includes a header portion 41 and a payload portion 43. The header portion 41 includes address information 45, a terminal identifier 47, routing policy information 49, and drop information 51. The packet header 41 further includes priority information 53 (to indicate the packet's assigned priority status), a copy indicator 55, a process identifier field 57 (used in addressing an appropriate processing service at the destination ground terminal), and a signal flag 59. Those skilled in the art of data communication will appreciate that FIG. 4 illustrates merely one example of many possible data packet configurations that may be used in accordance with the principles of the present invention. While the data packet header 41 contains address and associated control information used in routing the data packet to a desired recipient, the payload 43 contains the data being transmitted.

Data packets are transmitted through the LEO satellite network in accordance with a priority status assigned to each data packet, thus permitting the network to offer a number of different qualities of service to an end user. For example, data packets with a high priority are quickly routed through the network, allowing for a better quality of service (e.g., guaranteed transmission with minimum transmission delay). Lower priority data packets are routed with a lower level of priority than high priority packets, thereby providing a lower quality of service (e.g., "best effort" transmission with no guarantees). End users are charged depending on the quality of service that is selected for each transmission. For example, transmission of a data packet designated with higher priority may cost more than a lower priority transmission. End users select a quality of service according to their needs and the data packets sent by the end users are assigned an appropriate priority status that enables the network to transmit the data packets in a manner that meets or exceeds the selected quality of service.

A particular quality of service may be characterized by a wide variety of market demands and service parameters. In one proposed embodiment of the invention, four quality of service classes are defined. A hierarchy of priority status levels is provided to assist the network in providing the four quality of service classes. In one proposed embodiment of the invention, four levels of priority status are defined and denoted as P1, P2, P3 and P4.

Data packets designated with P1 priority status receive the highest quality of transmission service. For example, data packets assigned P1 status are guaranteed delivery through the network within a particular time. P1 data packets are transmitted at fixed data rates and over-subscription is not permitted. The quality of service guarantees associated with P1 priority status include limits on the amount of delay, jitter, and loss in transmission considered acceptable. Because packets with P1 priority status have guaranteed delivery, a portion of the P1 transmission capacity of the network may be reserved to transmit administrative instructions within the network.

Transmission of P2 data packets is given top priority in the absence of P1 data transmissions. A lesser degree of quality of service is associated with P2 traffic than with P1 traffic. For instance, quality of service guarantees with respect to delay or jitter are less strict. A higher data packet loss rate may be tolerated. P2 traffic may also have a statistical routing component and a level of over-subscription may be permitted.

P3 data packets have a lower priority than P1 and P2 traffic but are given priorty over P4 traffic. Typically, quality of service requirements associated with P3 traffic do not include maximum levels of transmission delay or jitter. In some instances, a maximum potential transmission loss may be specified, though the level is higher than that for P1 or P2 data transmission. Delivery of a P3 data packet is typically not guaranteed, nor is there a guarantee when a P3 transmission will be delivered. P3 data transmissions may be characterized as statistical, on-demand traffic.

Lastly, P4 data packets have the lowest priority in this hierarchy. P4 data transmissions are characterized as statistical, best-effort traffic. Delivery of P4 data packets is not guaranteed, nor are any quality of service parameters specified or expected. The LEO satellite network may admit P4 traffic but makes no commitment that the data transmissions will actually be completed. The delivery of P4 traffic is dependent upon data traffic flow in the satellite network.

While four quality of service classes and four priority status levels have been discussed above, those skilled in the art of data communication will recognize that the principles of the present invention allow any number of quality of service classes and priority status levels to be established. For instance, multiple classes of service may be defined to correspond to the classes of service supported by other transmission protocols, such as ATM or IPv6. Moreover, any number of priority status levels may be developed to assist the network in providing a data transmission that meets or exceeds a selected quality of service. A selected quality of service is mapped onto one or more of the priority status levels. Four levels of priority status are considered suitable for the embodiment of the invention discussed herein.

As noted earlier, bandwidth for uplink transmission of a data packet to a servicing satellite overhead is allocated based on the data packet's assigned priority status. According to another aspect of the present invention, uplink bandwidth is allocated on demand (i.e., at the time data packets are prepared for transmission). The system and method of the present invention for allocating uplink bandwidth is better understood in reference to FIG. 5 and the figures that follow thereafter.

Figure 5:
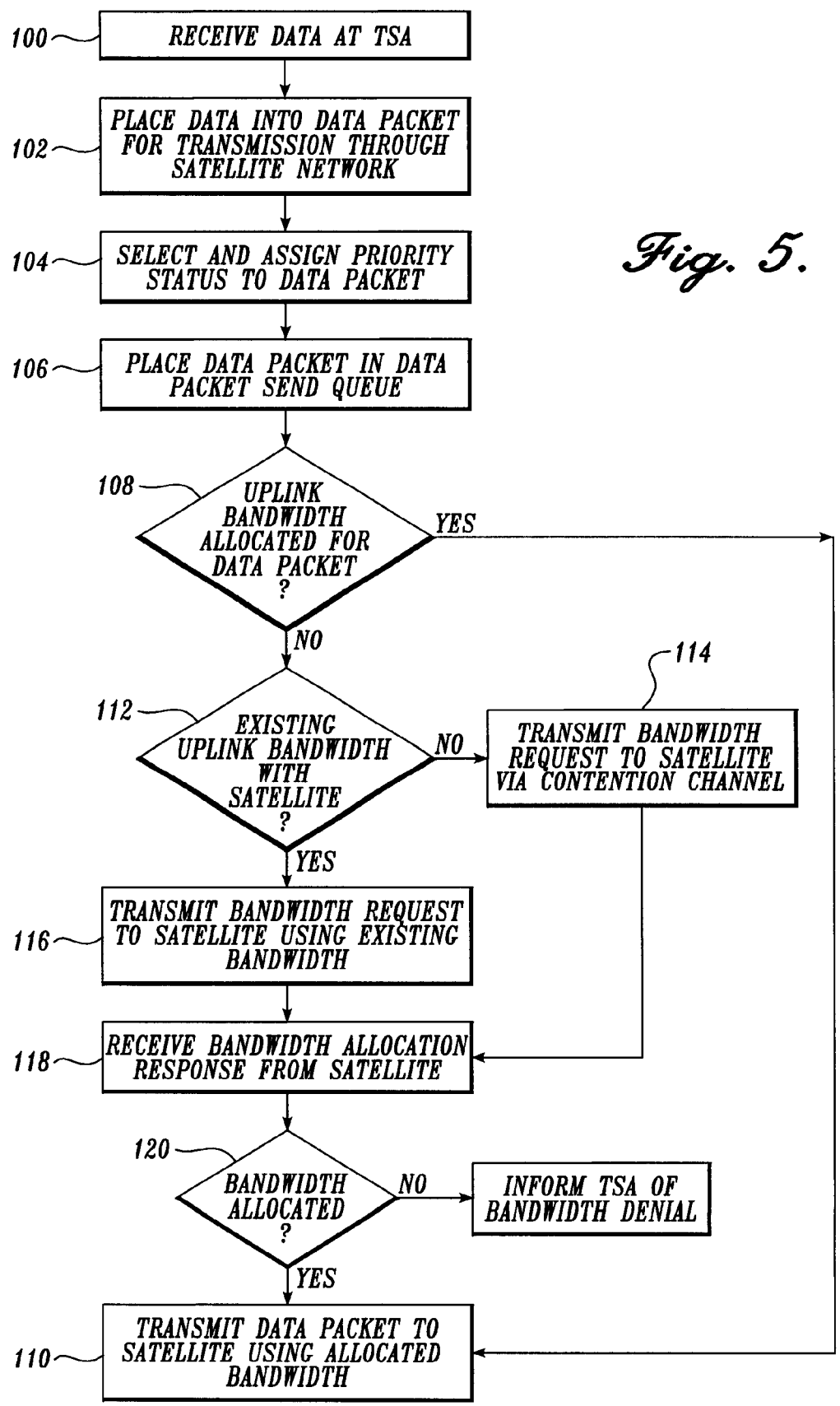
FIG. 5 is a flow diagram of a bandwidth allocation method according to the present invention.

FIG. 5 is a flow diagram illustrating one procedure performed in accordance with the present invention for receiving data, requesting uplink bandwidth, and transmitting the data to the servicing satellite overhead. As indicated in FIG. 5, data is received at a terminal service application (TSA) for transmission through the LEO satellite data communication network. (See block 100). The data received by a TSA may be any type of data, including raw, unformatted data, as well as data in data packets formatted by other computer networks. The data received by a TSA is placed into the payload of one or more data packets formatted by the TSA for transmission through the network (block 102). A representative method for formatting packets for transmission through the network is disclosed in the commonly assigned U.S. patent application Ser. No. 09/151,994 entitled "Method of Data Transmission in a Data Communication Network," incorporated herein by reference. At that stage, the TSA selects and assigns a priority status to each data packet (block 104). As discussed earlier, FIG. 4 illustrates one example of a data packet formatted for transmission through the LEO satellite network. A priority status assigned to a data packet is recorded in the priority information field 53 shown in FIG. 4. Because the present invention uses four priority levels, only two bits are necessary in the priority information field 53 to represent the priority status.

Figure 6:
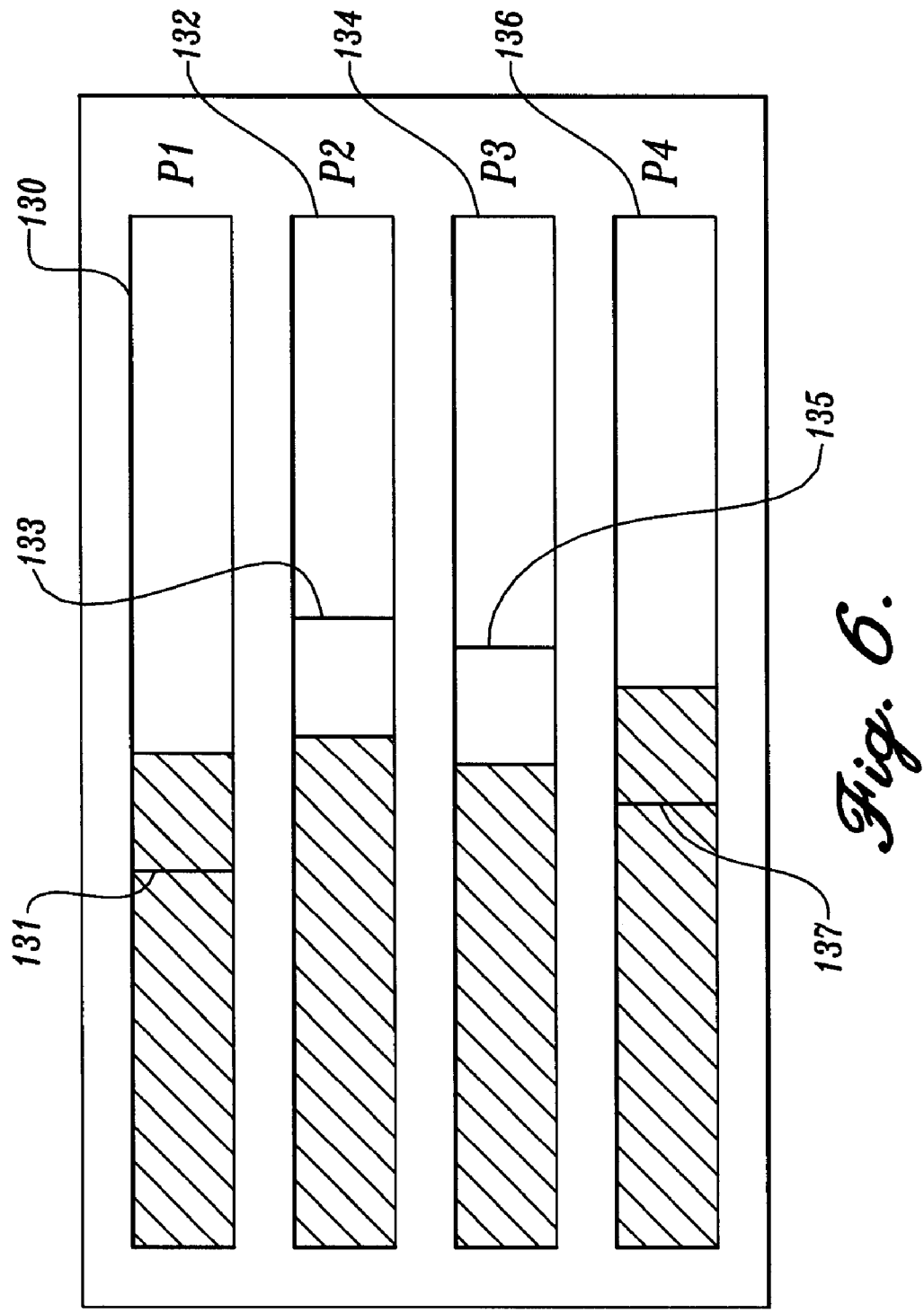
FIG. 6 is a pictorial diagram of a data packet send queue segregated according to data packet priority status.

Once the data is organized in a satellite network data packet with an assigned priority status, the data packet is placed in a data packet send queue (block 106) to await uplink transmission to the servicing satellite overhead. In one embodiment of the invention, the data packet send queue is maintained in the memory of a ground terminal (e.g., ground terminal 21a, 21b, 21c or 21d) associated with the TSA originating the data transmission. Alternatively, the data packet send queue is maintained in a memory by the TSA itself. Preferably, separate data packet send queues are defined for each of the different priority status levels that may be assigned to a data packet. For example, FIG. 6 illustrates four data packet send queues 130, 132, 134, and 136 corresponding to the four priority status levels P1, P2, P3 and P4. A data packet is placed into the data packet send queue that corresponds to the data packet's assigned priority status.

Before a ground terminal can transmit a data packet in a data packet send queue to a servicing satellite overhead, uplink bandwidth for transmission of the data packet must be allocated to the ground terminal. For this purpose, bandwidth is divided into segments of time and signal frequency. A bandwidth allocation provides both the time and signal frequency at which the ground terminal may transmit the data packets.

In one embodiment of the present invention, uplink transmission is divided into time periods called "frames." In each frame, a number of "slots" are defined that correspond to different signal frequencies in the uplink communication spectrum and different subdivisions of time within the frame. A table illustrating an example bandwidth allocation for a frame is shown in FIG. 7. The table is indexed horizontally by frequencies in the uplink communication spectrum and vertically by time subdivisions. Each box in the table represents a slot, and the table as a whole represents a frame. Each slot represents sufficient transmission capacity (time and signal frequency) for uplink transmission of at least one data packet. Preferably, each slot corresponds to sufficient transmission capacity for uplink transmission of exactly one data packet.

According to the present invention, uplink bandwidth may be allocated in two different formats. One format of bandwidth allocation is for a specified rate of data transmission (i.e., a number of data packets to be transmitted per frame). Accordingly, for a rate-based bandwidth allocation, a ground terminal is allocated a specified number of slots per frame for transmission of a corresponding number of data packets. For example, a ground terminal may be allocated five slots per frame for transmitting five P1 data packets.

A rate-based bandwidth allocation may be provided in a number of ways. For example, the bandwidth allocation request may include a flag that informs the satellite that the slots allocated in response to the request in the current frame should be allocated to the same ground terminal in subsequent frames. In that regard, a rate-based bandwidth allocation remains active for a ground terminal until specific steps are taken to deallocate the bandwidth. If it is necessary that the allocated time and frequency of the slots be reassigned in a subsequent frame (e.g., when data communication is handed over to a new servicing satellite or other significant event), the ground terminal is given advance notice of the change in slot allocation and the time at which the change becomes effective.

Alternatively, a rate-based bandwidth allocation may be provided by having a ground terminal repeatedly send requests for bandwidth allocation in each successive frame. This implementation may reduce the complexity of maintaining a rate-based allocation, particularly through satellite communication handover. Still further, a rate-based allocation may be provided by having the satellite place a bandwidth allocation request back in its processing queue once it has processed the request for the current frame. The satellite would continue to reprocess the request in each subsequent frame until a deallocation request is received.

Another format of bandwidth allocation is for a specified volume of data packets. In a volume-based bandwidth allocation, slots in a frame are allocated only once for transmission of a specified number of data packets. A volume-based bandwidth allocation does not continue indefinitely. Slots allocated in one frame are open in the next frame for allocation to other ground terminals. Consequently, it is typically not necessary to send a specific deallocation request for a volume-based bandwidth allocation.

In some circumstances, it is acceptable to provide a volume-based bandwidth allocation with portions of the request satisfied over a number of frames. For example, a bandwidth allocation for uplink transmission of ten data packets may include an allocation of two slots in one frame, an allocation of five slots in a subsequent frame, and an allocation of three slots in a frame thereafter. A volume-based bandwidth allocation with partial allocations per frame is preferably restricted to low priority transmissions because uncertainties exist as to how many slots may be assigned in a frame. As noted earlier, low priority transmissions typically do not enjoy any guarantees of minimal time delay in transmission. A volume-based bandwidth allocation for higher priority data packets is preferably extended on an all-or-nothing basis (i.e., the requested bandwidth must be allocated in a single frame or the bandwidth is not allocated at all).

Due to implementation constraints, a ground terminal typically cannot transmit at two different frequencies at the same time, nor can a ground terminal shift quickly from transmitting at one frequency to another frequency. These constraints are accounted for in the present invention by limiting ground terminal bandwidth allocation to one slot per time subdivision and allowing one or more time subdivisions to elapse between any required changes in allocated transmission frequency.

In FIG. 6, each of the data packet send queues 130, 132, 134, and 136 is shown having a threshold 131, 133, 135, and 137. When a data packet sent queue threshold is exceeded, a process for generating a bandwidth allocation request message is triggered. Bandwidth allocation request messages are transmitted by a ground terminal to a bandwidth allocation processing unit operating in the LEO satellite network. Exceeding the threshold 131, 133, 135, and 137 triggers different bandwidth allocation requests depending on whether a rate-based or volume-based allocation is used. For instance, a rate-based bandwidth allocation may be used with the P1 data packet send queue 130. Once the ground terminal associated with the data packet send queue 130 has obtained a bandwidth allocation for a certain rate of transmission, data packets in the data packet send queue 130 are transmitted to the servicing satellite at the allocated rate. If the data packet send queue 130 receives P1 data packets at a rate greater than the allocated transmission rate, the number of data packets in the data packet send queue will increase. If the number of data packets in the data packet send queue 130 exceeds the threshold 131, as shown by the shaded portion in FIG. 6, the ground terminal requests additional uplink bandwidth to accommodate the increased rate at which the data packet send queue is receiving data packets.

If, for another example, a volume-based bandwidth allocation is used with the P4 data packet send queue 136, data packets exceeding the threshold 137 trigger a request for bandwidth to transmit a certain number or all of the packets in the data packet send queue. For instance, if the number of packets in the data packet send queue 136 exceeds the threshold 137, as shown by the shaded portion in FIG. 6, the ground terminal requests an allocation of bandwidth to transmit some or all of the P4 data packets in the data packet send queue 136 for which bandwidth has not previously been allocated. It will be appreciated that the threshold 137 may be adaptively set to equal the remaining packet volume that may be transmitted in a volume-based bandwidth allocation.

The bandwidth allocation processing unit allocates a satellite's uplink bandwidth in response to bandwidth allocation requests it receives. In the embodiment of the invention discussed with particularity herein, the bandwidth allocation processing unit is implemented in a computer system onboard each LEO satellite. Alternatively, the bandwidth allocation processing unit is implemented in a bandwidth allocation terminal located on the Earth. To enable a LEO satellite to coordinate its uplink transmissions, a message reporting allocated bandwidth is periodically transmitted to the satellite. For the remainder of the description below, it is assumed that the bandwidth allocation processing unit is implemented onboard each servicing satellite.

Returning now to FIG. 5, after the data packet is placed in a data packet send queue corresponding to the packet's priority status (block 106), the ground terminal determines whether uplink bandwidth has previously been allocated for the data packet, either by a prior rate-based allocation or volume-based allocation (block 108). If sufficient bandwidth has already been allocated for transmission of the data packet, the ground terminal transmits the data packet to the servicing satellite at the allocated time and frequency (block 110). Preferably, data packets are coded and multiplexed into bit streams prior to transmission to the satellite. If sufficient uplink bandwidth has not been allocated for transmission of the data packet (block 108), the ground terminal must first transmit a bandwidth request message to the servicing satellite to obtain uplink bandwidth.

For the ground terminal to transmit the bandwidth request to the servicing satellite, the ground terminal must use either existing bandwidth already allocated to the ground terminal (e.g., for transmission of other data packets in one or more of the data packet send queues), or use a contention channel. Consequently, prior to transmitting the bandwidth allocation request to the servicing satellite, the ground terminal determines whether it has existing uplink bandwidth with the satellite (block 112). If the ground terminal does not have an existing bandwidth allocation, the ground terminal transmits the bandwidth allocation request "out-of-band" via a contention channel (block 114). An out-of-band transmission in this regard involves formulating a data packet exclusively for carrying the bandwidth allocation request.

A contention channel is a communication frequency that remains open for unscheduled data transmissions between a satellite and ground terminals in its footprint. Using a contention channel, there is a risk that the satellite will not successfully receive a data packet sent by a ground terminal. For instance, if two or more ground terminals simultaneously transmit packets on the contention channel, the data signals will overlap and the satellite may not be able to discern between the signals. For that reason, after a bandwidth allocation request is transmitted via a contention channel, it is preferred that the satellite send either a response allocating bandwidth or at least an acknowledgment signal to the requesting ground terminal to confirm that the bandwidth allocation request was successfully received.

If, at decision block 112, the ground terminal determines that it already has an existing bandwidth allocation for transmission of other data packets, the ground terminal transmits the bandwidth allocation request to the servicing satellite using the existing bandwidth (block 116). In that regard, the bandwidth allocation request may be piggy-backed within a data packet already allocated transmission bandwidth (also known as "in-band" data transmission) as a more efficient alternative to transmission in a separate data packet (i.e., out-of-band transmission).

Regardless of whether a bandwidth allocation request is communicated in-band or out-of-band, the bandwidth request includes both an identification of the ground terminal requesting the bandwidth and the priority status of the data packets for which uplink bandwidth is requested. The bandwidth request may also include a flag identifying the request as "rate-based," depending on the implementation of rate-based bandwidth allocation as earlier described. Moreover, a separate bandwidth allocation request may be sent for each of the different data packet priorities. Thus, for example, FIG. 8A illustrates a first bandwidth allocation request 150 identifying ground terminal "$GT_1$" as requesting an amount C1 of uplink bandwidth for P1 status data packets. Similarly, bandwidth allocation requests 154 and 156 identify $GT_1$ as requesting the amounts C3 and C4 of uplink bandwidth for P3 and P4 status data packets, respectively. A sign bit included in the bandwidth request indicates whether the request is for allocation of bandwidth (e.g., using a plus sign or a positive number) or deallocation of bandwidth (e.g., using a minus sign or negative number). Bandwidth request 152 therefore indicates a request to deallocate uplink bandwidth in the amount C2 for P2 status data packets.

Alternatively, a ground terminal may combine bandwidth allocation requests for different packet priorities into a single bandwidth allocation request 158, as illustrated in FIG. 8B. In the example shown in FIG. 8B, the bandwidth allocation request 158 identifies $GT_1$ as requesting an allocation of the respective amounts C2, C3, and C4 of bandwidth for packets having P2, P3, and P4 priority status, and requesting a deallocation of the amount C1 of bandwidth for packets having P1 priority status.

The servicing satellite overhead receives the packet with the bandwidth allocation request and processes the bandwidth allocation request, as described below in greater detail. Afterward, the servicing satellite generates a bandwidth allocation response that reports the outcome of the bandwidth allocation process. The servicing satellite transmits the bandwidth allocation response to the requesting ground terminal via a downlink transmission frequency. Returning again to FIG. 5, after receiving the bandwidth allocation response from the satellite (block 118), the ground terminal evaluates the bandwidth allocation response to determine whether bandwidth has been allocated (block 120). If the ground terminal finds that the requested bandwidth was allocated, the ground terminal transmits data packets with the corresponding priority status at the allocated time and frequency (block 110). If the ground terminal finds that the requested bandwidth was not allocated (e.g., the bandwidth allocation response reports a "zero" amount of allocated bandwidth), the ground terminal preferably informs the TSA originating the data packets that the requested bandwidth has been denied (block 122) and thus the data packets will not be sent. The bandwidth allocation request may be resubmitted at a later time if bandwidth is denied.

Before proceeding to discuss a bandwidth allocation process performed by a servicing satellite in accordance with the present invention, an example timeline is provided in FIG. 9 to illustrate the timing of a bandwidth request, allocation, and subsequent uplink transmission. For purposes of this discussion, the example timeline is numbered beginning with frame zero.

In frame zero, a ground terminal transmits a bandwidth allocation request to the servicing satellite. The bandwidth allocation request is transmitted either in-band or out-of-band. Because propagation delay is greatly reduced in a LEO satellite network (as compared to a geosynchronous satellite network), the bandwidth allocation request is shown as being received by the servicing satellite in frame one.

In frame two, the bandwidth allocation request is processed by a bandwidth allocation processing unit implemented onboard the servicing satellite. A bandwidth allocation processor is discussed in greater detail below in connection with FIG. 10. As a result of this processing, uplink transmission bandwidth is either allocated or denied. A response reporting the allocation or denial of bandwidth is sent back to the requesting ground terminal in frame three. In frame four, the requesting ground terminal receives the response.

Assuming the response reported an allocation of uplink bandwidth, in frame five the ground terminal transmits one or more data packets at the allocated time and frequency to the servicing satellite. In frame six, the data packets are received by the servicing satellite, and in subsequent frames, the data packets are routed through the constellation of satellites to the satellite that services the ground terminal that is to receive the data packet.

Thus, according to the timeline shown in FIG. 9, when a ground terminal transmits a bandwidth allocation request during frame zero, the ground terminal understands that if bandwidth is allocated in response to the request, the bandwidth will be allocated for frame five at the earliest. It should be understood that each of the events shown in FIG. 9 is constantly repeated as bandwidth allocation requests are transmitted from frame to frame. For example, in frame one, while the bandwidth allocation request of frame zero is being received by the servicing satellite, the ground terminal may be transmitting yet another bandwidth allocation request. Likewise, in frame two, while the bandwidth allocation processor is processing the bandwidth allocation request received in frame one, the servicing satellite may be receiving another bandwidth allocation request sent by the ground terminal in frame one. Accordingly, the events illustrated in FIG. 9 are not completed as a cycle for one bandwidth allocation request before another bandwidth allocation request can be sent. Rather, all of the events illustrated in FIG. 9 occur simultaneously in a pipeline fashion for bandwidth allocation requests sent in each frame.

Figure 10:
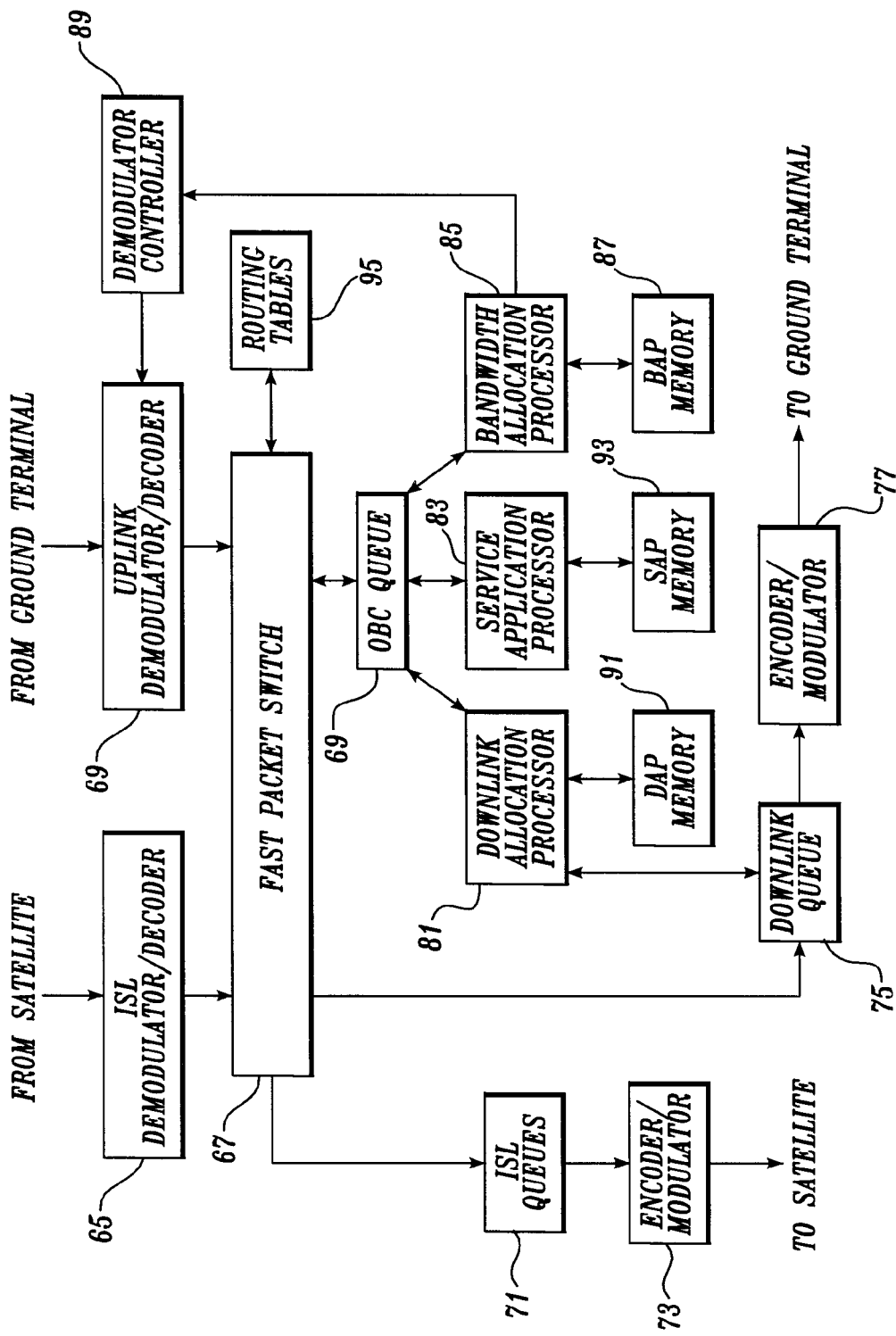
FIG. 10 is a block diagram illustrating the major routing and processing components onboard a LEO satellite.

The manner in which data packets are handled by a servicing satellite, including data packets with bandwidth allocation requests, is better understood in reference to FIG. 10. FIG. 10 is a block diagram that illustrates the major routing and processing components provided onboard each of the LEO satellites of the satellite data communication network.

As shown in FIG. 10, a LEO satellite receives data transmissions either from other satellites via an intersatellite link (ISL) or from ground terminals via an uplink channel. Data packets received from other satellites are forwarded to the satellite's ISL demodulator/decoder 65. Data packets received from ground terminals are forwarded to the satellite's uplink demodulator/decoder 69. In either case, a portion of the data packets received, such as the data packets' headers, or all of the data packets, is demodulated and decoded. The demodulated/decoded data packets are then communicated to a fast packet switch 67 for routing.

The fast packet switch 67 inspects the addressing and signal information in the data packets' headers to determine whether the data packets should be routed to another satellite, downlinked to a ground terminal, or forwarded to a processor implemented onboard the satellite. Data packets to be routed to another satellite are added to one of the satellite's ISL queues 71 that corresponds to the satellite that is to receive the data packets. The data packets are encoded and modulated at block 73, and transmitted to another satellite via an ISL channel. A variety of technologies may be used for intersatellite communication, including radio frequency (RF) and laser intersatellite links.

If the fast packet switch 67 determines that the received data packets should be routed for downlink transmission to a ground terminal, the data packets are entered into the satellite's downlink queue 75. From the downlink queue 75, the data packets are encoded and modulated at block 77 and transmitted to the ground terminal via a downlink channel.

Both the ISL queues 71 and the downlink queue 75 of the satellite are implemented in a memory. Preferably, the memory for each of the queues is segmented into four sections representing the four different packet priorities in the priority status hierarchy (e.g., P1, P2, P3, and P4). Each of the four memory sections may be considered a separate queue. Each memory section is sized to reflect the maximum amount of data transmissions anticipated at a point in time with respect to each of the four priorities. The scheduling of time and signal frequency at which data packets are transmitted to other satellites or to a ground terminal depends upon the priorities assigned to the packets and their position in the respective queues. Higher priority data packets are scheduled for more prompt transmission than lower priority data packets.

If the fast packet switch 67 determines that one or more of the received data packets should be forwarded to a processor onboard the satellite, the data packets are entered into an onboard computer queue (OBC) 79. For instance, a data packet may be directly addressed to an onboard processor such as a bandwidth allocation processor 85 in an out-of-band transmission. Alternatively, signaling information may be included in a data packet header to inform the fast packet switch 67 that the data packet includes an in-band request for uplink bandwidth allocation. The fast packet switch 67 forwards a copy of the data packet to the OBC queue 79. More specifically in that regard, the header 41 illustrated in FIG. 4 is shown to include a signal flag 59 and a copy indicator 55. A ground terminal sets the copy indicator 55 to indicate that the data packet carries an in-band message. The signal flag 59 is set to signal the existence of a bandwidth allocation request. When the fast packet switch 67 receives a data packet from the uplink demodulator/decoder 69 and recognizes a set copy bit in the data packet header, the fast packet switch copies the data packet into the OBC queue 79. Because the data packet payload also includes data intended for routing elsewhere in the satellite network, the fast packet switch 67 forwards the data packet to either the intersatellite link (ISL) queue 71 for transmission to another satellite, or downlink queue 75, for transmission to the Earth, whichever is appropriate. Furthermore, once the packet has been copied into the OBC queue 79, the copy bit 55 is reset so no further copies are made.

The OBC queue 79 is preferably implemented in a memory accessible to the satellite's onboard processors. The satellite's onboard processors include a downlink allocation processor (DAP) 81, a service application processor (SAP) 83, and a bandwidth allocation processor (BAP) 85. The BAP 85, in particular, is responsible for managing the allocation of uplink bandwidth. Multiple OBC queues may be provided (e.g., a different queue for each of the onboard processors) depending on the network design and the needs of the processors in the onboard computer. Moreover, multiple queues may be provided for segregating bandwidth allocation requests according to the priorities of the data packets to be transmitted so that the BAP 85 may efficiently process the requests according to the assigned priorities.

As noted earlier in reference to FIG. 7, uplink bandwidth is preferably divided into slots representing segments of time and signal frequency. Uplink bandwidth is allocated by the BAP 85 according to programmed rules that govern the assignment of available bandwidth slots. The rules are implemented as computer program instructions stored in a BAP memory 87 and dictate how slots are assigned for each type of packet priority status. The rules also determine which slots previously allocated for transmission of lower priority data packets (e.g., P3 or P4) may be preempted in favor of packets having higher priorities (e.g., P1 or P2). The allocation rules may take into account a variety of factors, such as the available uplink frequencies assigned to particular ground terminals, whether the ground terminal requesting uplink bandwidth already has an existing bandwidth allocation, and whether congestion is present in network communication links. The bandwidth allocation rules are programmed to form a data structure representing allocated and available bandwidth (see, e.g., the bandwidth allocation table in FIG. 7) that is recorded in the BAP memory 87. The downlink allocation processor 81 and the service application processor 83 also have a DAP memory 91 and a SAP memory 93, respectively, to assist in their processing tasks. Because the bandwidth allocation rules are programmable, the rules may be rewritten or revised by a network administrator in response to changing user needs, network traffic patterns, or developing technologies. The network administrator transmits the new rules to the satellite to replace the rules in use at the time.

The uplink bandwidth of a satellite is represented by a data structure that includes a plurality of slots as earlier described. The slots represent portions of the uplink bandwidth. One data structure suitable for use in this regard is a table as shown in FIG. 7. The bandwidth allocation table in FIG. 7 includes a number of slots indexed on a vertical axis by signal frequencies $f_1, f_2, f_3, f_4 \ldots f_n$, and on a horizontal axis by times of transmission $t_1, t_2, t_3, t_4 \ldots t_p$. The signal frequencies $f_1$ through $f_n$ are portions of the communication spectrum allotted for uplink transmission. The time divisions $t_1$ through $t_p$ represent the time periods within a frame in which a data packet may be transmitted by a ground terminal. In other words, in each frame, a total number of n packets may be simultaneously transmitted by different ground terminals to the servicing satellite during each of p time periods.

The bandwidth allocation table is updated by the bandwidth allocation processor for each frame of uplink transmission. As bandwidth is allocated for uplink transmission of data packets, entries are made into each of the slots in the bandwidth allocation table to identify both the transmitting ground terminal and the priority status assigned to the data packet to be transmitted in the slot. For example, in FIG. 7, the slots for frequency $f_1$, at times $t_1, t_2$, and $t_3$ are allocated to ground terminal $GT_1$ for uplink transmission of three P1 data packets. Similarly, the slots identified by frequency $f_2$ at times $t_1$ and $t_2$ have been allocated to ground terminal $GT_2$ for transmission of two P2 data packets. Slots having a zero entered therein (e.g., at slots $f_1t_4, f_2t_3, f_4t_3$, and $f_4t_4$) have not yet been allocated. While only a portion of the entries in the bandwidth allocation table of FIG. 7 is shown, it is understood that all of the slots have an entry therein (e.g., a bandwidth allocation or a "zero").

As noted earlier, rate-based bandwidth allocations continue from frame to frame indefinitely until specifically deallocated or released. Thus, as the bandwidth allocation processor updates the bandwidth allocation table for each frame, previously allocated rate-based slots remain allocated in the table from frame to frame. In that regard, a flag set when the rate-based request is received may be used to prompt the bandwidth allocation processor to allocate the same slots from frame to frame. Alternatively, the slots may be allocated in each frame by responding to repeated bandwidth requests sent from the ground terminal or by repeatedly reprocessing the original bandwidth request, as earlier described. The other, nonrate-based slots are opened up for allocation according to the bandwidth allocation requests in the onboard computer (OBC) queue.

Figure 11A:
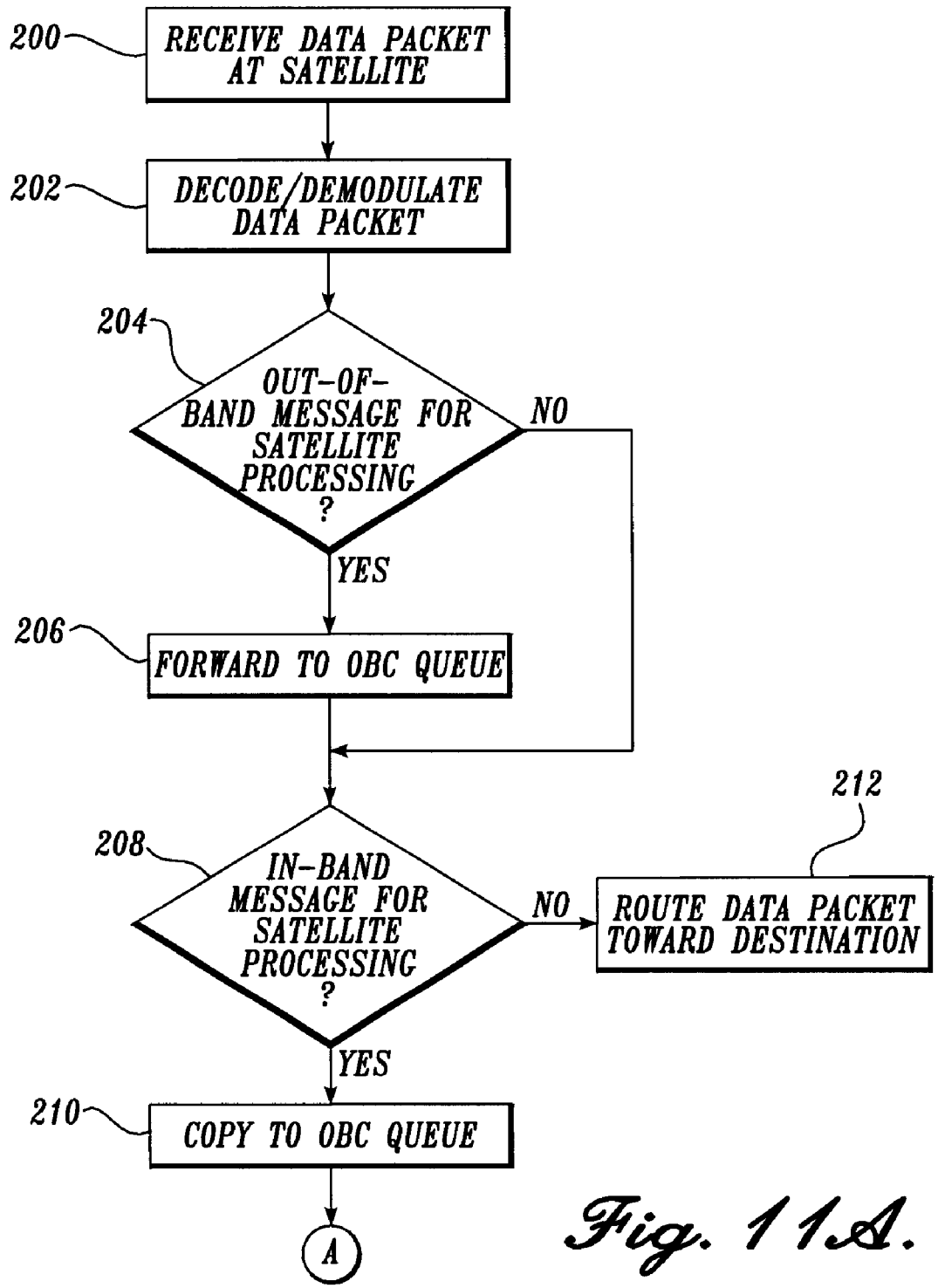
FIGS. 11A and 11B are flow diagrams of a bandwidth allocation process performed onboard a LEO satellite in accordance with the present invention.
Figure 11B:
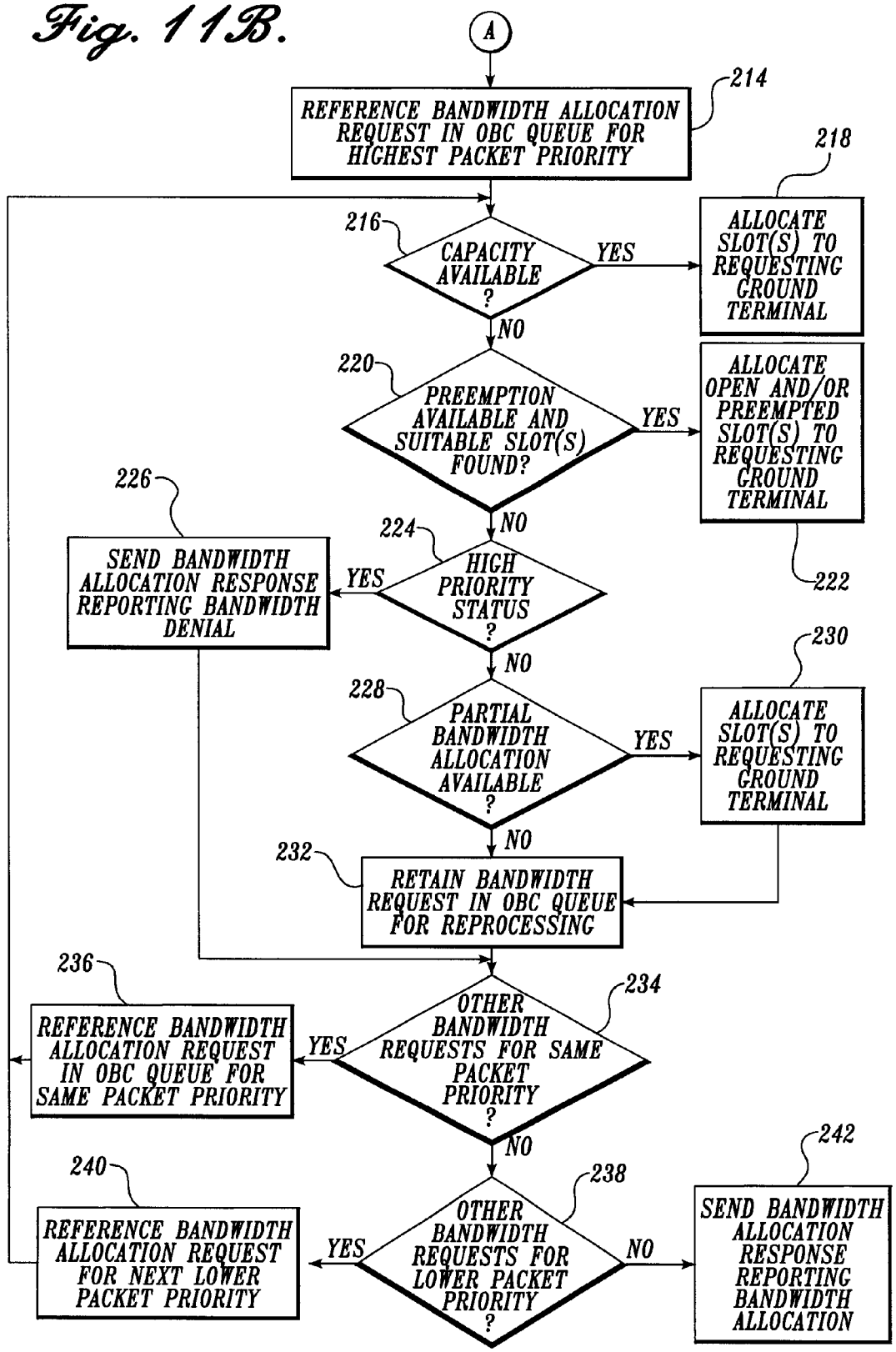

FIG. 11A is a flow diagram that illustrates one procedure for handling a data packet received at a LEO satellite while FIG. 11B illustrates one procedure for bandwidth allocation performed in accordance with the present invention. In FIG. 11A, after a satellite receives an uplink transmission of a data packet (block 200), the satellite decodes and demodulates a portion or all of the data packet (block 202). At decision block 204, the satellite's fast packet switch determines whether the data packet is an out-of-band message transmission intended for processing by one of the satellite's onboard processors (e.g., the bandwidth allocation processor). If so, the packet is forwarded to the OBC queue (block 206) to be processed by one or more of the processors in the onboard computer. At decision block 208, the fast packet switch determines whether the data packet includes an in-band transmission for processing onboard the satellite.

If so, a copy of the data packet with the in-band transmission is forwarded to the OBC queue (block 210). A data packet carrying data not intended for onboard processing are routed by the fast packet switch toward the addressed destination of the data packet (block 212). In that regard, the data packets may be routed to another satellite via an intersatellite link or downlinked to a ground terminal on the Earth.

The bandwidth allocation procedure illustrated in FIG. 11B begins with a bandwidth allocation processor (BAP) referencing a bandwidth allocation request stored in the OBC queue (block 214). An example OBC queue is depicted in FIG. 12 with three bandwidth allocation requests 250, 252, and 254. In actual operation, it is expected that an OBC queue would contain many more than three bandwidth allocation requests.

The three bandwidth allocation requests 250, 252, and 254 are of a format as shown in FIG. 8B wherein a ground terminal requests bandwidth for different priority data packets in a single combined request. Bandwidth allocation request 250 shows ground terminal $GT_2$ requesting bandwidth for uplink transmission of eight packets having P1 status, three packets having P2 status, and seven packets having P4 status. Similarly, bandwidth allocation request 252 shows ground terminal $GT_3$ requesting bandwidth for uplink transmission of six P3 data packets and bandwidth allocation request 254 shows ground terminal $GT_5$ requesting bandwidth for four P1 data packets, two P3 data packets, and six P4 data packets.

Returning to FIG. 11B, the BAP references the portion of a bandwidth allocation request requesting bandwidth for packets with the highest priority status (block 214). The BAP evaluates the bandwidth allocation request and determines whether uplink transmission capacity is available for the amount of bandwidth requested (block 216). More particularly, the BAP searches a current bandwidth allocation data structure (e.g., the table in FIG. 7) to determine whether sufficient slots are available to be allocated to the requesting terminal for uplink transmission of data packets having the particular designated priority status. For example, in processing the bandwidth allocation request 250 (FIG. 12), the BAP determines whether eight slots are available in the bandwidth allocation table for $GT_2$ to transmit eight P1 data packets. For the sample bandwidth allocation table shown in FIG. 7, available slots include the unallocated slots indicated with an entry of "0." Furthermore, as part of determining whether uplink capacity is available, the BAP also checks with a demodulator controller 89 (FIG. 10) that controls the uplink demodulator/decoder 69 to ensure that the demodulator/decoder 69 will be capable of handling the incoming uplink transmission at the time it arrives. If enough slots are available to accommodate the bandwidth allocation request, the BAP allocates the number of needed slots to meet the request (block 218). In that regard, information is entered into the table identifying the ground terminal to which the slots are allocated and the priority status of the data packets to be transmitted in those slots.

If sufficient unallocated slots are not available to satisfy the bandwidth allocation request, the BAP determines whether slots previously allocated for transmission of lower priority data may be preempted in favor of accommodating the current bandwidth allocation request. For example, bandwidth allocation request 254 shows ground terminal $GT_5$ asking for uplink bandwidth to transmit four P1 data packets. The BAP processing this request may scan the bandwidth allocation table depicted in FIG. 7 and find an insufficient number of unallocated slots to accommodate the requested bandwidth. If preemption is permitted, however, the BAP may deallocate the slots assigned to ground terminal $GT_3$ for P4 data packets at slots $f_4t_1$, and $f_4t_2$. These two slots along with the available slots at $f_4t_3$ and $f_4t_4$ (indicated with the number "0") are then allocated to $GT_5$ for transmission of four P1 data packets, as requested. If an alternative bandwidth allocation cannot be found for $GT_3$, the BAP informs $GT_3$ of the deallocation. In this manner, higher priority data (e.g., data designated with P1 priority status) may obtain a bandwidth allocation over lower priority data (e.g., P3 data packets). Thus, in FIG. 11B, if the bandwidth allocation rules governing bandwidth allocation provide for preemption (block 220), and suitable slots are located for preemption (e.g., preempting an allocation for lower priority data in favor of higher priority data), the BAP allocates the preempted slots, along with suitable open, unallocated slots, if any, to the requesting terminal in satisfaction of the bandwidth request (block 222).

Because higher priority data packets are typically time-sensitive, a bandwidth allocation for high priority data is preferably done on an all-or-nothing basis (partial bandwidth allocation is not permitted). In that regard, if preemption is not permitted and/or suitable slots for preemption are not found, the BAP determines whether the requested bandwidth was for higher priority (e.g., P1 or P2) data packets (block 224). If the request was for higher priority data packets, a bandwidth allocation response is transmitted to the requesting terminal indicating that the bandwidth allocation request has been denied (block 226).

The BAP determines whether partial bandwidth allocation is available (block 228). As noted earlier, partial allocations are generally reserved for lower priority data due to the uncertainty of when the bandwidth request will be fully satisfied. If partial bandwidth allocation is permitted and one or more slots are found in the current bandwidth allocation table, the BAP allocates the slots to the requesting terminal (block 230). The bandwidth allocation request is retained in the OBC queue (block 232) so that the remaining portion of the requested bandwidth may be allocated in a subsequent frame. Preferably, the retained bandwidth request is associated with a timer mechanism (e.g., a countdown register or other suitable timer) so that if a predetermined time period expires and the request has not been satisfied, the bandwidth allocation request is denied and a response indicating such is sent to the requesting terminal. In this manner, bandwidth allocation requests are not retained indefinitely.

As discussed above, bandwidth requests for uplink transmission of high priority data packets are processed before bandwidth requests for low priority data packets. Accordingly, after allocating (or denying) bandwidth to a requesting terminal for uplink transmission of data packets having a particular priority, the BAP determines whether other bandwidth allocation requests in the OBC queue include bandwidth requests for data packets of the same priority (block 234). Thus, continuing with the example above, after assigning bandwidth to ground terminal $GT_5$ for four P1 data packets in response to bandwidth allocation request 254 (FIG. 12), the BAP determines whether bandwidth allocation request 250 or 252 includes a bandwidth request for P1 data packets. If the BAP finds bandwidth requests in the OBC queue for transmission of data packets having the same priority (e.g., the request in bandwidth allocation request 250 for transmission of eight P1 data packets), the BAP references the same priority bandwidth requests (block 236) and processes each of the same priority bandwidth requests (starting at block 216) as described above. Otherwise, the BAP proceeds to determine whether the OBC queue contains bandwidth requests for lower priority data packets (block 238). If such requests are found, the BAP references the lower priority bandwidth requests (block 240) and processes each of the lower priority requests (starting at block 216). To continue the above example, after processing the bandwidth requests 250 and 254 for P1 data packets, the BAP proceeds to allocate bandwidth for P2 data packets in response to bandwidth request 250, for P3 data packets in response to bandwidth requests 252 and 254, and for P4 data packets in response to bandwidth requests 250 and 254, in that order of priority status. For each bandwidth allocation request at each level of packet priority status, the BAP processing returns to block 216 and the subsequent processing shown in FIG. 11B to evaluate and allocate bandwidth to the requesting ground terminals.

Finally, prior to the end of a frame, or when a bandwidth allocation table is completely filled, the BAP closes the bandwidth allocation for that frame and generates a bandwidth allocation response reporting the outcome of the allocation process to all of the ground terminals that requested uplink bandwidth. For the bandwidth allocation requests that resulted in allocated bandwidth, the requesting terminals are notified of the time and frequency at which to transmit the corresponding priority data packets. An acknowledgment of bandwidth requests that were not satisfied but were retained in memory for processing in future frames is given to those requesting terminals affected. Accordingly, the affected requesting terminals will understand to wait for a report in a future frame that uplink bandwidth has been allocated or denied. Bandwidth denials are also reported in the allocation responses.

After generating the bandwidth allocation response, the BAP forwards the response to the satellite's downlink queue for downlink transmission to the requesting ground terminals (block 242). In one embodiment of the invention, the bandwidth allocation response is broadcast from the satellite to all ground terminals in the satellite's footprint. The particular ground terminals addressed by the allocation response receive and process the response, while the non-addressed ground terminals ignore the response. Furthermore, as an alternative to transmitting bandwidth allocation responses individually, the responses are, preferably collected into an aggregate allocation response that is broadcast via downlink transmission. The ground terminals addressed in the bandwidth allocation response will recognize and act upon the aggregate bandwidth allocation response by transmitting data packets at the time and frequency allocated to them.

Just as uplink bandwidth is dynamically allocated in response to a bandwidth request message, the system and method of the present invention also provide for dynamic release of allocated bandwidth that might otherwise go unused. A positive or negative sign added to an allocation request indicates a requested allocation or release of uplink bandwidth. Allocating and/or releasing uplink bandwidth according to the requests of end users is often referred to as "bandwidth-on-demand." The bandwidth-on-demand features described herein help maximize use of limited available communication spectrum.

When allocating bandwidth, the BAP may act on the bandwidth allocation requests for each packet priority in the order the requests were received in the OBC queue. Alternatively, the bandwidth allocation rules stored in the BAP memory may instruct the BAP to first process bandwidth requests of ground terminals that presently do not have any allocated bandwidth. To facilitate this preferential treatment, a table may be maintained in the BAP memory listing all active ground terminals in the satellite's footprint. See, for example, the list illustrated in FIG. 13. Having access to the list of active terminals, the BAP may scan the bandwidth allocation table (FIG. 7) to determine which active terminals presently do not enjoy a bandwidth allocation and give preference to bandwidth allocation requests in the OBC queue received from those terminals. For example, while ground terminal $GT_5$ is listed in FIG. 13 as an active terminal, the bandwidth allocation table in FIG. 7 does not show $GT_5$ having any allocated bandwidth. Accordingly, bandwidth allocation request 254 in FIG. 12 (from $GT_5$) is processed first for each level of packet priority. Still further, a bandwidth allocation request may include a signal flag that, when set, instructs the BAP to give preference to that bandwidth allocation request above the other requests. In that regard, if a ground terminal has a bandwidth request for transmission of critical data, even though it presently enjoys an existing bandwidth allocation, it may set the signal flag to obtain further preferential treatment.

While a preferred embodiment of the invention has been illustrated and described, it will be appreciated that various changes can be made therein without departing from the spirit and scope of the invention. For instance, as noted earlier, rather than processing bandwidth allocation requests onboard a satellite, a central ground terminal with a bandwidth allocation processing unit may perform the bandwidth allocation procedure of the invention. As the uplink bandwidth in each frame is allocated, the bandwidth processing terminal transmits a copy of the bandwidth allocation table to the satellite so the satellite can coordinate uplink transmission. Moreover, while the present invention contemplates that each slot is assigned on a packet basis, it will be appreciated that each slot in the bandwidth allocation table may represent a larger portion of data such as multiple packets or blocks of data (e.g., 1K blocks). Furthermore, because the bandwidth allocation rules are programmable, various preferences and adjustments to the handling of bandwidth request messages may be entered in the BAP memory when updating the bandwidth allocation rules. In that manner, bandwidth allocation according to the present invention is intended to be flexible to meet different uplink transmission needs as they arise. It is intended therefore that the scope of the invention be determined from the following claims and equivalents thereto.

The embodiments of the invention in which an exclusive property or privilege is claimed are defined as follows:

1. A method of allocating bandwidth for uplink transmission of one or more data packets in a non-geosynchronous orbit (NGSO) satellite data communication network, comprising:

(a) generating a bandwidth request message requesting allocation of an amount of bandwidth to a ground terminal for uplink transmission of one or more data packets, each of the one or more data packets individually having a priority status assigned thereto, the bandwidth request message identifying the priority status of the data packets for which bandwidth is sought;

(b) transmitting the bandwidth request message to a bandwidth allocation processing unit;

(c) processing the bandwidth request message at the bandwidth allocation processing unit to allocate bandwidth to the ground terminal in accordance with the priority status identified in the bandwidth request message, the processing producing an allocation outcome;

(d) generating a bandwidth allocation response reporting the allocation outcome; and (e) transmitting the bandwidth allocation response to the ground terminal.

2. The method of claim 1, wherein a bandwidth request message identifying a higher priority status is processed before a bandwidth request message identifying a lower priority status.

3. The method of claim 1, wherein processing the bandwidth request message includes:
(a) defining a data structure that represents the bandwidth for uplink transmission of data packets, wherein the data structure includes a plurality of slots that represent portions of the bandwidth;
(b) selecting one or more slots in the data structure to be allocated to the ground terminal, wherein the number of slots selected is based on the amount of bandwidth requested in the bandwidth request message; and
(c) allocating the selected one or more slots to the ground terminal, thereby allocating the portion of bandwidth represented by the one or more slots to the ground terminal for uplink transmission of data packets having the priority status identified in the bandwidth request message.

4. The method of claim 3, wherein each slot of the plurality of slots represents both a time portion and a frequency portion of the bandwidth.

5. The method of claim 4, wherein the data structure is a table indexed in a first dimension by time portions of the bandwidth and in a second dimension by frequency portions of the bandwidth.

6. The method of claim 4, wherein selecting a slot in the data structure includes:
(a) searching the data structure for an unallocated slot;
(b) if an unallocated slot is found, determining whether the unallocated slot may be allocated to the ground terminal; and
(c) selecting the unallocated slot if the unallocated slot may be allocated to the ground terminal.

7. The method of claim 6, wherein determining whether the unallocated slot may be allocated to the ground terminal includes determining whether the ground terminal has already been allocated a slot that represents a time portion of the bandwidth that overlaps the time portion represented by the unallocated slot.

8. The method of claim 6, wherein determining whether the unallocated slot may be allocated to the ground terminal includes determining whether the unallocated slot represents a frequency portion of the bandwidth that is different from a frequency portion represented by a slot already allocated to the ground terminal for a different time portion of the bandwidth.

9. The method of claim 3, further including:
(a) if the number of slots selected does not satisfy the amount of bandwidth requested in the bandwidth request message, determining whether a partial bandwidth allocation is permitted;
(b) if partial bandwidth allocation is permitted, allocating the selected slots to the ground terminal; and
(c) retaining the bandwidth request for reprocessing, wherein the amount of bandwidth requested by the bandwidth request message is reduced by the amount of bandwidth represented by the selected slots that were allocated.

10. The method of claim 9, wherein partial bandwidth allocation is permitted only for transmission of data packets having a low priority status identified in the bandwidth request message.

11. The method of claim 3, wherein selecting a slot in the data structure includes:
(a) searching the data structure for an allocated slot;
(b) if an allocated slot is found, determining whether the allocation of the slot may be preempted in favor of allocation to the ground terminal to satisfy the bandwidth request message being processed;
(c) if the allocation of the slot may be preempted, deallocating the allocated slot; and
(d) selecting the deallocated slot.

12. The method of claim 11, wherein determining whether the allocation of the slot may be preempted includes determining whether the priority status of the data to be transmitted using the allocated slot is lower than the priority status identified in the bandwidth request message.

13. The method of claim 11, wherein the allocation of a slot may be preempted only for transmission of data packets having a high priority status identified in the bandwidth request message.

14. The method of claim 11, further comprising selecting and allocating another slot in the data structure to replace the bandwidth allocation of the preempted slot.

15. The method of claim 1, wherein the bandwidth allocation processing unit is implemented onboard a NGSO satellite in the NGSO satellite data communication network.

16. The method of claim 1, wherein the bandwidth allocation processing unit is implemented in a bandwidth processing terminal on the Earth and a message notifying of allocated bandwidth is periodically transmitted by the bandwidth processing terminal to the NGSO satellite whose bandwidth is being allocated.

17. The method of claim 1, wherein the amount of bandwidth requested in the bandwidth request message represents a rate of data packet transmission, and wherein bandwidth allocated for a rate of data packet transmission remains allocated until specifically deallocated.

18. The method of claim 1, wherein the amount of bandwidth requested in the bandwidth request message represents a volume of data packets to be transmitted, and wherein bandwidth is allocated for transmission of a volume of data packets having a high priority status only if the requested bandwidth can be fully allocated in a single frame.

19. The method of claim 1, wherein a bandwidth request message requesting bandwidth for a ground terminal that does not have an existing bandwidth allocation is processed before a bandwidth request message requesting bandwidth for a ground terminal that already has an existing bandwidth allocation.

20. The method of claim 1, wherein a bandwidth request message is generated in response to data packets placed in a data packet send queue that exceed a threshold set for the data packet send queue.

21. The method of claim 1, wherein the bandwidth allocation response is transmitted to a number of ground terminals and the ground terminal to which the bandwidth allocation response is directed acts upon the bandwidth allocation response while the remaining ground terminals receiving the transmission ignore the bandwidth allocation response.

22. The method of claim 1, wherein the bandwidth request message is processed at the bandwidth allocation processing unit in accordance with programmable rules stored in a memory accessible to the bandwidth allocation processing unit.

23. A data communication system for a non-geosynchronous orbit (NGSO) satellite data communication network, comprising:

(a) one or more ground terminals that generate and transmit bandwidth request messages to a bandwidth allocation processing unit to obtain allocation of an amount of bandwidth for uplink transmission of data packets, each of the data packets individually having a priority status assigned thereto; and (b) a bandwidth allocation processing unit for allocating bandwidth to the one or more ground terminals in response to transmitted bandwidth request messages, wherein a bandwidth request message identifies the priority status of the data packets to be transmitted, and wherein bandwidth is allocated in accordance with the amount of bandwidth and priority status identified in the bandwidth request message.

24. The data communication system of claim 23, wherein the bandwidth allocation processing unit is implemented onboard a NGSO satellite in the NGSO satellite data communication network.

25. The data communication system of claim 24, wherein bandwidth request messages transmitted to the NGSO satellite are entered into a queue in a memory accessible to the bandwidth allocation processing unit implemented onboard the satellite.

26. The data communication system of claim 25, wherein the memory includes multiple queues and bandwidth request messages are entered into a queue corresponding to the priority status identified in the bandwidth request messages.

27. The data communication system of claim 23, wherein the bandwidth allocation processing unit is implemented in a bandwidth processing terminal on the Earth and a message notifying of allocated bandwidth is periodically transmitted by the bandwidth processing terminal to the NGSO satellite whose bandwidth is being allocated.

* * * * *